Oct. 25, 1932.  J. R. McWANE  1,884,065
PIPE JOINT
Filed Sept. 9, 1930
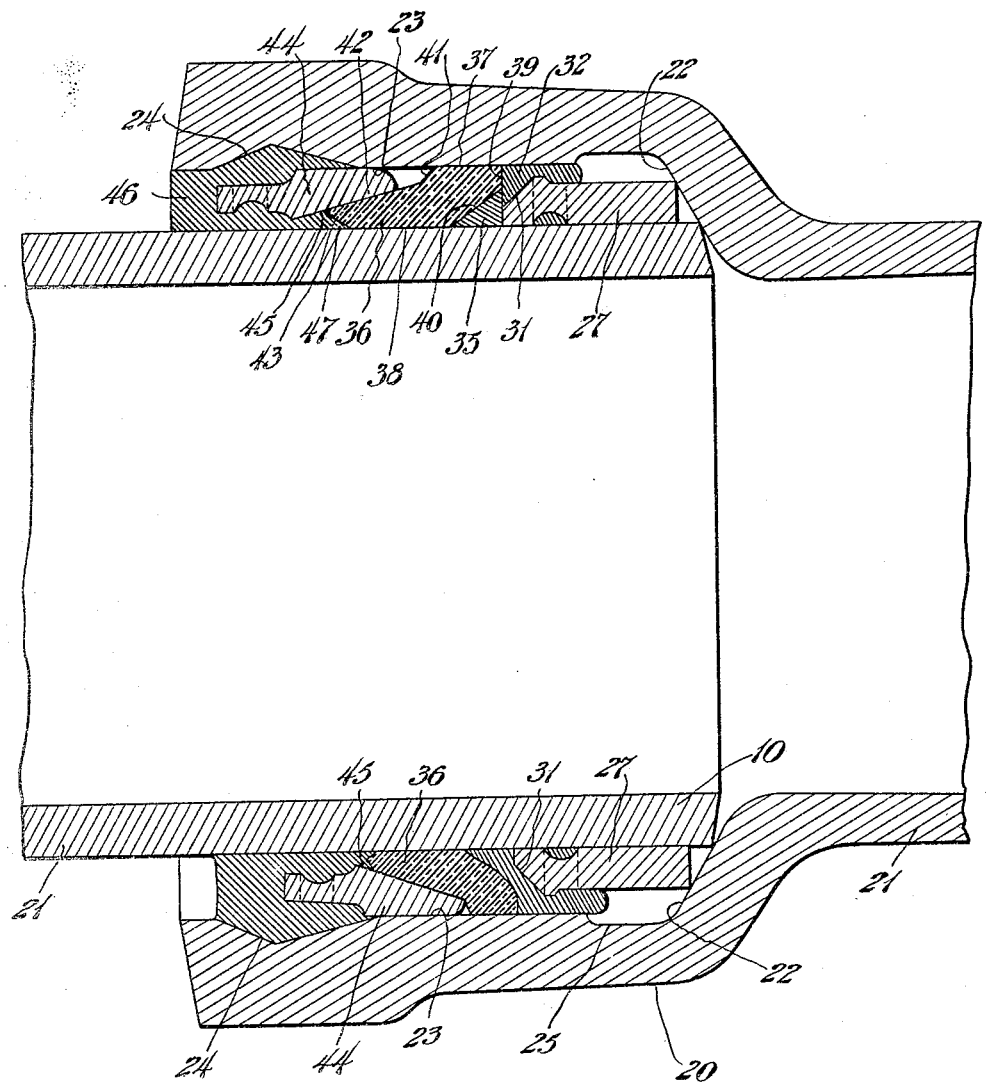
INVENTOR
J. R. McWane
BY
Siggers & Adams
ATTORNEYS Patented Oct. 25, 1932

1,884,065

UNITED STATES PATENT OFFICE

JAMES R. McWANE, OF BIRMINGHAM, ALABAMA, ASSIGNOR TO McWANE CAST IRON PIPE COMPANY, OF BIRMINGHAM, ALABAMA, A CORPORATION OF ALABAMA

PIPE JOINT

Application filed September 9, 1930. Serial No. 480,781.

This invention relates to pipe joints and, among other objects, aims to provide an improvement on the pipe joint described and claimed in my pending application, Serial No. 431,860 filed February 27, 1930. The improved pipe joint is particularly useful in connection with high pressure gas mains but could be used with bell and spigot pipes conducting fluids of various kinds.

In the accompanying drawing forming a part of this application, and showing a preferred embodiment of the invention, the single figure is a diametric section through a pipe joint showing at the top the joint materials after assembly and showing at the bottom the complete pipe joint with the calking finished.

Referring particularly to the drawing, the joint materials are shown as being assembled in the joint space between a spigot 10 and bell 20 of sections 21 of cast iron pipe. The bell in this instance presents an inwardly beveled or inclined annular shoulder 22 at its base, an intermediate cylindrical machined surface 23 and a lead groove 24 near the mouth. The internal diameter of the bell near the base is somewhat larger than the cylindrical portion 23 and provides a tool clearance space 25.

The joint materials to be described are adapted to be assembled in the joint space about a cylindrical mandrel (not shown) as will be understood by referring to the pending application. These joint materials are assembled one by one in the space between the bell and the mandrel, and after the complete joint has been assembled, the mandrel is withdrawn and the pipe may then be shipped to the point where it is to be used. In the trench in which the pipe is laid the spigot 10 is thrust into the bell, and the joint is completed by a final calking.

As particularly described in the pending application, at the bottom of the bell 20 is a substantially cylindrical ring made of a series of specially shaped metal blocks 27 flexibly connected by lead at one end and seated so that their free ends are directly against the shoulder 22, the ring thus providing an abutment or anvil against which lead may be calked to provide a primary seal at the bottom of the bell. As shown, the blocks 27 project beyond the clearance space 25 and are adjacent to the machined portion 23. As the blocks 27 are fully described and claimed in the co-pending application, further description will be omitted here except to point out the inclined outer faces 31 against which lead 32 is calked to wedge the inner faces of the blocks 27 initially against the aforementioned mandrel and finally against the spigot 10.

The most important function of this calked lead 32 is to provide a seal on the bell side outside of the blocks positively to prevent the escape of gas or flow of condensates outwardly into contact with the flexible packing to be described.

After the excess lead is calked around the upper tapered ends of the blocks 27, as shown at the top of the figure, a cast lead ring 35 is inserted so that it rests against the upper or outer ends of the blocks 27. This ring is initially of such diameter as to slide over the mandrel and preferably is a right triangle in cross section, the base of the triangle being abutted against the blocks 27 and the mass of lead 32, and the apex of the triangle being initially adjacent the mandrel. The purpose of the ring 35 is three-fold. First, it provides additional calking lead, which when finally calked wedges the blocks 27 against the spigot (whose diameter is slightly less than that of the mandrel). Second, it provides a separate seal adjacent the spigot which will prevent gas or condensates from escaping between it and the spigot. Third, the lead ring 35 provides an outer, smooth inclined plane surface for sliding contact with a similar but inwardly facing surface on a flexible packing ring to be described, thereby to tighten the packing ring against the bell by the reaction arising from longitudinal movement of the packing ring.

The flexible packing just mentioned is shown in the form of a rubber ring or gasket 36 having a straight or cylindrical outer surface 37 and an inner straight or cylindrical surface 38, these surfaces, however, not being directly opposite each other. The diameter of the outer surface 37 is such that the rubber ring initially fits snugly in the bell, while the diameter of surface 38 slightly exceeds that of the mandrel, so that the rubber ring may be slipped over the mandrel. One end 39 of the rubber packing ring is preferably substantially square and flat so as to abut directly against the mass of lead 32, after the latter is calked. The same end is beveled by the provision of an inner inclined wedging surface 40 which directly contacts with the outer inclined face of the triangular lead ring 35. Intermediate the ends of the packing ring, and on the outer or bell side thereof, there is a shoulder 41 which is preferably tapered toward the outer cylindrical surface 37. At the opposite end from the face 40 the rubber packing ring tapers almost to a point, having two frusto-conical faces 42 and 43. The frusto-conical face 42 is on the bell side, extending from the shoulder 41 to the extremity of the ring while the face 43, which is quite short, extends from a cylindrical face 38 to the same extremity. Thus the point or nose of the packing ring is spaced from the spigot and will not obstruct free movement of the spigot into the bell.

The rubber packing ring 36 is adapted to be wedged inwardly against the spigot and simultaneously outwardly against the bell by means of a co-operating wedge ring consisting of an assembly of specially shaped metal wedges 44. The wedges are each arcuate transversely so as to conform to the outwardly presented, arcuate surface 42 of the rubber gasket 36 and exert uniform pressure against and all around its periphery, and also to conform to the machined surface 23 of the bell, with which they are in contact. The inner ends of the wedges 44 are beveled or tapered and have blunt, preferably curved, points, which are initially spaced some distance from the shoulder 41 of the rubber gasket, as appears at the top of the figure. The wedges have a very pronounced taper in a radial direction, as shown, and their inner faces 45 have the same angularity relative to machined surface 23 as the outer face 42 of the rubber ring, which they engage. Thus when the wedge ring is pushed inwardly longitudinally of the bell, as in the final calking, the rubber ring 36 is thrust laterally inwardly against the spigot. The longitudinal movement of the wedges 44 also tends to effect longitudinal inward movement of the rubber ring, because of the shape of the wedges and their sliding engagement with the bell, and this in turn causes a tightening of the rubber ring against the inside surface of the bell because of the inclined plane provided by the lead ring 35, and also because of the elasticity of the rubber. The curved or blunt ends of wedges 44, when calking is completed, so engage shoulder 41 as to transmit a longitudinal thrust to the rubber ring without forcing it away from the surface of the bell.

The effect of inward driving of the wedges 44 is rather accurately shown at the bottom of the figure. Lateral expansion and longitudinal distortion and movement of the rubber ring 36 and lead ring 35 have taken place. Note also the lead ring 35 has become amalgamated with the lead mass 32.

The ring of wedges 44 is held assembled by means of a narrow strip of lead similar to the lead strip shown in Fig. 9 of the co-pending application, and hence not described. This lead strip becomes amalgamated with a mass of lead 46 which, in the last step of the assembly operation, is poured into the mouth of the bell after the ring of wedges is inserted. As soon as this molten lead is hardened, the mandrel is withdrawn, and the prepared joint is complete. After the spigot 10 has been inserted, the lead 46 is calked, as shown at the bottom of the figure. As will be noted, the lead 46 is poured into contact with the frusto-conical surface 43 on the rubber ring, thus providing an annular fin 47 which will positively prevent the outer pointed end of the rubber ring from being displaced inwardly in the way of the spigot when the spigot is inserted.

The lower part of the figure shows the effect of finally calking the joint in the field. As the calking lead is driven inwardly, the wedges 44 are driven by it, thus wedging and compressing the rubber packing ring and distorting it as shown. The calking lead also becomes amalgamated with the lead holding the ring of wedges 44. The rubber packing in turn forces the triangular ring of lead 35 into such close contact with the mass of lead 32 that the two lead bodies become united and they flow as a single mass under the great pressure until the excess lead moves out into the space between the blocks 27 and the clearance space 25. The calked lead is firmly held in place by the lead groove 24 at the mouth of the bell.

While the lead 32 has been described as a primary seal, and will actually prevent escape of gas under pressure, under some conditions, the joint is incomplete unless an elastic gasket of rubber or the like is used in conjunction with tightening means. This is because of the movement which takes place between the pipe sections, due to expansion and contraction, subsidence of the soil, etc. Lead alone cannot maintain a tight seal when movement takes place but the rubber gasket does make possible a perfectly tight seal under all conditions. Nor can rubber rings alone be used to best advantage, because of oxidation and other chemical actions which destroy rubber. Hence I claim herein a new combination of elements making up a complete pipe joint especially useful for pipe lines. As the rubber ring is specifically new, I also claim it per se as a novel element of the patentable combination.

Referring to the pending application, it will be seen that two rubber gaskets are used. While this arrangement is quite satisfactory, a considerable improvement is effected by employing the present construction, which eliminates the V-shaped gasket of the earlier construction and which reduces the quantity of the lead and substitutes a rubber ring 36 of new design as well as a ring of novel calking wedges 44, and a novel triangular lead ring 35. In the older construction, when calking takes place, the upwardly extending flange of the lead 36 tends to force the rubber over against the bell while sealing the spigot side. By increasing the depth of this flange of lead and changing the shape of the solid rubber gasket at the bottom, both inside and outside, the driving force of the wedges not only forces the solid rubber gasket over against the spigot, but drives the gasket downwardly and outwardly, because of the inclined face of the lead ring 35, effectually sealing the joint both inside and outside with only one gasket, thereby effecting highly desirable economies.

Another of the advantages of this new arrangement is that the iron-to-iron contact of the wedges, instead of the rubber-to-rubber contact on the bell side, will cause the wedges to move down much more easily than they do under the old arrangement. In the use of the V-shaped gasket, there is a tendency for the rubber of one gasket to bind against the rubber of the other gasket, with excessive friction; and on the outside of the joint, the friction of rubber-to-iron (as in the pending application) is greater than the friction of iron against iron (as in the present case). Instead of the V-shaped gasket sliding down easily between a solid rubber on one side and the metal of the bell on the other side, the rubber stretches and the force of the blows during calking is taken up partly in the stretching of the rubber necessary to make the wedges go down instead of forcing the solid rubber over against the spigot, as is intended.

In order for the wedges to function perfectly, it is necessary that there be some giving way of the foundation on the bell side so that the calking wedges can go down. This is accomplished in the wedging of the lead between the bottom ring of blocks and the bell. Under hard calking, this lead will recede through the space between the ring of blocks and the bell, allowing the gasket to go down; and as it goes down, tightening of the rubber ring against the bell takes place. The relatively large movement permitted wedges 44 during the calking operation insures tightening of the rubber ring against the spigot, so that a two-fold tightening takes place, and the thrust is delivered simultaneously to the bell and spigot over the relatively large areas afforded by cylindrical surfaces 37 and 38.

Obviously the present invention is not restricted to the particular embodiment thereof herein shown and described. Moreover, it is not indispensable that all the features of the invention be used conjointly, since they may be employed advantageously in various combinations and sub-combinations.

What I claim is:—

1. A bell and spigot pipe joint comprising, in combination, a ring of spacer blocks at the bottom of the bell; a mass of lead holding the blocks and in contact with both the bell and spigot; a solid rubber ring adjacent to the mass of lead and in contact with both the bell and the spigot; a ring of wedges adjacent to the solid rubber ring and in contact interiorly with a face of said ring which is presented outwardly toward the bell, said ring of wedges also contacting with the bell but being out of contact with the spigot; and a mass of calking lead at the top of the bell, holding the joint materials in position, surrounding the outer end of the ring of wedges and being in contact with both the bell and spigot.

2. A bell and spigot pipe joint comprising, in combination, a ring of spacer blocks at the bottom of the bell; a mass of lead holding the blocks and in contact with both the bell and the spigot; said mass of lead having an annular initially frusto-conical wall which extends from a point about midway between the bell and spigot to the exterior of the spigot; a solid rubber ring adjacent said mass of lead and having a wall shaped complementarily to the aforesaid wall of the lead mass; the two walls providing relatively movable wedge surfaces; and tightening means at the top of the bell in contact with the bell and spigot for holding the joint materials in position.

3. A bell and spigot pipe joint comprising, in combination, a ring of spacer blocks at the bottom of the bell; a mass of lead holding the blocks and in contact with both the bell and the spigot; said mass of lead having an annular initially frusto-conical wall which extends from a point about midway between the bell and spigot to the exterior of the spigot; a solid rubber ring adjacent said mass of lead and having a wall shaped complementarily to the aforesaid wall of the lead mass; the two walls providing relatively movable wedge surfaces; a ring of wedges adjacent to the solid rubber ring and in contact interiorly with an outwardly presented face of said rubber ring; and a mass of calking lead surrounding the outer end of the ring of wedges and being in contact with both the bell and spigot and holding the joint materials in position.

4. A bell and spigot pipe joint comprising, in combination, a ring of spacer blocks at the bottom of the bell; a mass of lead holding the blocks and in contact with both the bell and the spigot; said mass of lead being composed of two parts, one of which holds the spacer blocks while the other is a separate ring having a substantially triangular cross-section, and set so that the base of the triangle is abutted against the lead holding the spacer blocks while the apex of the triangle is adjacent the exterior of the spigot; a solid rubber ring adjacent said mass of lead and having an interior wall shaped to fit against the outer face of said triangular ring; the two contacting walls providing relatively movable wedge surfaces tending to thrust the rubber ring outwardly against the bell and inwardly against the spigot when the joint is tightened; and tightening means at the top of the bell in contact with the bell and spigot for holding the joint materials in position.

5. A bell and spigot pipe joint comprising, in combination, a ring of spacer blocks at the bottom of the bell; a mass of lead holding the blocks and in contact with both the bell and the spigot; said mass of lead being composed of two parts, one of which holds the spacer blocks while the other is a separate ring having a substantially triangular cross-section, and set so that the base of the triangle is abutted against the lead holding the spacer blocks while the apex of the triangle is adjacent the exterior of the spigot; a solid rubber ring adjacent said mass of lead and having an interior wall shaped to fit against the outer face of said triangular ring; the two contacting walls providing relatively movable wedge surfaces tending to thrust the rubber ring outwardly against the bell and inwardly against the spigot when the joint is calked; a ring of wedges adjacent to the solid rubber ring and in contact interiorly with an outwardly presented face of said rubber ring; and a mass of calking lead surrounding the outer end of the ring of wedges and being in contact with both the bell and spigot, and when calked, holding the joint materials in position.

6. A bell and spigot pipe joint comprising, in combination, a mass of lead near the bottom of the bell; said mass of lead having a wall which is frusto-conical; a solid rubber ring in contact with both the bell and spigot and having a frusto-conical wall contacting with the similar wall on the lead mass; the outer end of said rubber ring tapering to a point which is initially spaced from both the bell and spigot; a ring of wedges in contact with the solid rubber ring and lying generally outside the same and being in contact with the bell; and tightening means to hold the ring of wedges in position.

7. A bell and spigot pipe joint comprising, in combination, a mass of lead near the bottom of the bell; means for holding said mass spaced from the bottom of the bell; said mass of lead having a wall which is frusto-conical; a solid rubber ring in contact with both the bell and spigot and having a frusto-conical inner wall contacting with the similar wall on the lead mass; the outer end of said rubber ring tapering to a point which is spaced from both the bell and spigot; a ring of wedges in contact with the solid rubber ring and lying generally outside the same and being in contact with the bell; said rubber ring also having an outer tapering shoulder intermediate the ends of the ring; said ring of wedges having the inner ends initially spaced from the tapering shoulder of the rubber ring; the ring of wedges, during calking, forcing the rubber ring longitudinally and also thrusting the rubber ring against the exterior of the spigot; the frusto-conical wall on the mass of lead, during calking, expanding the ring against the interior of the bell; and tightening means to hold the ring of wedges in position.

8. A bell and spigot joint comprising, in combination, metallic means fixed in the joint room and providing a frusto-conical surface extending from the spigot to a point between the spigot and the bell; a rubber ring having a frusto-conical face contacting with the metallic frusto-conical surface and having a cylindrical surface adjoining said frusto-conical face and engaging the exterior of the spigot; said rubber ring also having an exterior cylindrical surface engaging the interior of the bell and being on the opposite side from the frusto-conical face, so that longitudinal movement of the ring over the frusto-conical surface tends to expand the ring against the bell; said ring tapering to a point at the opposite end from the metallic means; annular means having an inner frusto-conical surface engaging an outer frusto-conical surface on the rubber ring; and tightening means at the top of the bell holding the annular means and the other joint materials after tightening.

9. A flexible, compressible packing means for bell and spigot pipe joints comprising a rubber ring having a tapered outer surface opposite as approximately straight innner surface at one end and a tapered inner surface opposite an approximately straight outer surface at the other end of the ring.

10. A flexible, compressible packing means for bell and spigot pipe joints comprising a rubber ring having a tapered outer surface opposite an approximately straight inner surface at one end and a tapered inner surface opposite an approximately straight outer surface at the other end of the ring; said ring also having an outside annular shoulder intermediate its ends.

11. A flexible, compressible packing means for bell and spigot pipe joints comprising a rubber ring having a tapered outer surface opposite an approximately straight inner surface at one end and a tapered inner surface opposite an approximately straight outer surface at the other end of the ring; said ring also having an outside annular shoulder intermediate its ends; said shoulder being between the straight outer surface and the tapered outer surface and being tapered also but at a greater angle than the aforesaid tapered outer surface.

12. A flexible, compressible packing means for bell and spigot pipe joints comprising a rubber ring having a tapered outer surface opposite an approximately straight inner surface at one end and a tapered inner surface opposite an approximately straight outer surface at the other end of the ring; said ring having an outside tapered shoulder intermediate its ends and a substantially flat end at right angles to and adjoining the aforesaid straight outer surface.

13. A flexible, compressible packing means for the bell and spigot pipe joints comprising a rubber ring having one end square and the other end tapering to a point; said tapered end being provided by two frusto-conical surfaces the inner of which is short, while the outer is relatively long; a shoulder intermediate the ends of the ring at the outside thereof and at the base of the longer frusto-conical surface; and another frusto-conical surface on the inside extending from the squared end toward the tapered end; said ring also having inner and outer substantially cylindrical surfaces.

14. A bell and spigot joint comprising, in combination, a primary seal near the bottom of the bell; a rubber ring adjacent the primary seal and in contact with the bell and spigot, said rubber ring having an outside, frusto-conical surface terminating in a tapered shoulder; a ring of wedges engaging the bell and being tapered longitudinally, fitting over the frusto-conical surface of the rubber ring; each wedge having a blunt end initially spaced from said shoulder and, after calking, engaging the aforesaid shoulder at the point of least diameter so as to obviate thrusting the rubber ring away from the bell; and tightening means engaging the ring of wedges.

15. A bell and spigot joint comprising, in combination, a unitary rubber ring having inside and outside straight, cylindrical surfaces for contact with the spigot and bell respectively, and frusto-conical surfaces presented inside and outside and respectively at the inner and outer ends of the bell; a ring of wedges engaging over the outside frusto-conical surface and also engaging the inside of the bell; means providing a wedge surface near the bottom of the bell against which the inside frusto-conical surface engages when the ring is seated; and tightening means to force the ring of wedges inwardly, thereby to expand the rubber ring radially against both the spigot and the bell.

16. A bell and spigot joint comprising, in combination, a rubber ring having inside and outside cylindrical surfaces in contact with the spigot and bell, respectively, and inside and outside frusto-conical surfaces at opposite ends; a ring of flexibly connected metallic wedges having direct contact on their outer surfaces with the bell and having direct contact on their inner surfaces with the outside frusto-conical surface of the ring; and tightening means to force the ring of wedges inwardly and to hold the joint materials in position.

In testimony that I claim the foregoing as my own, I have hereto affixed my signature.

JAMES R. McWANE.